(12) United States Patent
Hara (10) Patent No.: US 6,253,790 B1
(45) Date of Patent: Jul. 3, 2001

(54) FUEL TANK FOR MOTORCYCLE

(75) Inventor: Ikuo Hara, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/378,713

(22) Filed: Aug. 23, 1999

(30) Foreign Application Priority Data

Aug. 26, 1998 (JP) ................................. 10-240645

(51) Int. Cl.[7] .............................. F02M 37/04; B65J 35/00
(52) U.S. Cl. ................... 137/565.17; 123/509; 123/514; 280/835
(58) Field of Search ...................... 137/565.17; 123/509, 123/514; 280/834, 835

(56) References Cited

U.S. PATENT DOCUMENTS

| 4,354,469 | * | 10/1982 | Sato ................................ 123/514 X |
| 4,653,762 | * | 3/1987 | Nakamura et al. ................. 280/835 |
| 4,871,041 | * | 10/1989 | Saito et al. ....................... 280/834 X |
| 5,988,213 | * | 11/1999 | Yoshioka .......................... 123/509 X |
| 6,065,452 | * | 5/2000 | Yoshioka ............................ 123/509 |

FOREIGN PATENT DOCUMENTS

| 36 00 964 | * | 7/1987 | (DE) | .................................. 123/509 |
| 55-148958 | * | 11/1980 | (JP) | .................................. 123/509 |
| 1257686 | | 10/1989 | (JP) | . |
| 2-28075 | * | 1/1990 | (JP) | .................................. 280/834 |

* cited by examiner

*Primary Examiner*—John Rivell
(74) *Attorney, Agent, or Firm*—Birch, Stewart, Kolasch & Birch, LLP (57) ABSTRACT

A fuel tank assembly for a motorcycle and a method for assembly thereof, in which a fuel pump can reliably suck in fuel when a fuel level fluctuates in response to acceleration, deceleration or changing posture of the motorcycle, and when there is little fuel in the tank. The invention provides a cup disposed on the bottom of the fuel tank which may house a fuel pump and a fuel suction filter. Because the fuel suction filter is mounted within the cup, it is not necessary to pass the filter through a hole in the bottom of the tank during assembly. This allows the use of a large filter without forming a large hole in the tank, and further increases the fuel capacity of the tank. A peripheral edge of the tank opening hinders the flow of fuel from the cup to the tank during changes in motorcycle posture, which maintains the fuel suction filter's submergence in fuel.

19 Claims, 6 Drawing Sheets

FUEL TANK FOR MOTORCYCLE

BACKGROUND OF THE INVENTION

1. Field of the Invention

This invention relates to a fuel tank assembly for a motorcycle, and a method of assembling the fuel tank assembly. More particularly, a fuel tank is described in which the fuel pump can reliably suck in fuel when the fuel level is low and when the fuel level fluctuates extensively.

2. Background Art

A configuration of a motorcycle fuel tank is known which includes a fuel pump at the bottom of the fuel tank, the pump serving to suck in fuel from the bottom of the tank. This arrangement is disclosed in Japanese Patent Laid-Open No. Hei. 1-257686, entitled "Fuel Tank". In FIGS. 1 through 3 and 5 of the related art, a pair of right and left main frames 14, 14 extend rearwardly from the rear end of a cylindrical steering shaft 12 of the body frame 10. A fuel tank 50 is placed on the main frames 14, has a protrusion 52 formed at the bottom thereof, and extends downwardly through the main frames 14. The protrusion 52 has an opening 64 on its bottom, through which a fuel pump 62 and a filter 73 are inserted into the fuel tank 50. The opening 64 is closed by a cover plate 66.

In the foregoing background art the filter 73 may be exposed to air if the fuel tank 50 houses a small amount of fuel, and if the fuel level fluctuates extensively due to acceleration deceleration or a change in posture of the motorcycle. This result is undesirable because when air is sucked in via the exposed filter 73, the fuel pump 62 rotates idly and cannot reliably suck fuel in.

In order to improve the suction performance of the fuel pump, the suction resistance of the filter may be reduced by using a large filter 73. However, the larger the filter 73, the larger the opening 64 must be in order to allow insertion of the filter into the tank. In order to maintain the rigidity of the fuel tank 50 with such a large filter, either a peripheral edge of the large opening 64 must be reinforced, or the fuel tank 50 must be thickened. These modifications are undesirable because they increase the weight and cost of manufacture of the fuel tank.

SUMMARY OF THE INVENTION

The fuel tank assembly of the present invention overcomes one or more of the disadvantages associated with conventional fuel tank assemblies.

The invention provides an apparatus and method of assembly that enable fuel to be reliably sucked in by a fuel pump even when the fuel tank houses a small amount of fuel, and further when the fuel level fluctuates extensively due to acceleration, deceleration or changing posture of a motorcycle.

The invention also provides an apparatus and method of assembly allowing the installation of a large fuel suction filter in a fuel tank having a small opening.

The invention further provides an apparatus and method of assembly allowing the use of a large fuel suction filter without reinforcement of a peripheral edge of the tank opening.

The invention additionally provides a fuel tank assembly of increased capacity.

In order to accomplish the foregoing objects, a motorcycle fuel tank assembly is provided having a fuel pump unit which is partially disposed in a cup having an open end, a fuel suction filter of the fuel pump unit is disposed within the cup, an opening having a diameter smaller than an inner diameter of the cup is formed on a bottom surface of the fuel tank, a portion of the fuel pump unit is inserted into the fuel tank via the opening, and the cup is attached to the fuel tank, thus forming a fuel tank assembly. Portions of the fuel pump unit which may be inserted through the opening into the fuel tank include the fuel pump, a flow path filter, connecting hoses, etc.

In this configuration, when the fuel level in the tank fluctuates extensively due to acceleration, deceleration or changing attitude of the motorcycle, and while there is a small amount of fuel in the fuel tank, a peripheral edge of the small opening prevents fuel from flowing into the fuel tank from the cup. As a result, the fuel suction filter is not exposed to air and can therefore reliably suck fuel without drawing air.

Because the relatively large fuel suction filter is housed within the cup, and need not pass through the opening in the fuel tank during assembly, the opening for inserting the fuel pump into the fuel tank may have a diameter which is smaller than an inner diameter of the cup. Therefore, it is not necessary to reinforce the peripheral edge of the small opening. It is further not necessary to thicken the fuel tank.

Further scope and applicability of the present invention will become apparent from the detailed description given hereinafter. However, it should be understood that the detailed description and specific examples, while indicating preferred embodiments of the invention, are given by way of illustration only, and various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described with reference to an embodiment shown in the accompanying drawings. "Front, rear, right, left, upper and lower" sides denote directions as viewed by a rider. "Fr" denotes the front side, "Rr" denotes the rear side, "L" denotes the left side, and "R" denotes the right side.

Figure 1:
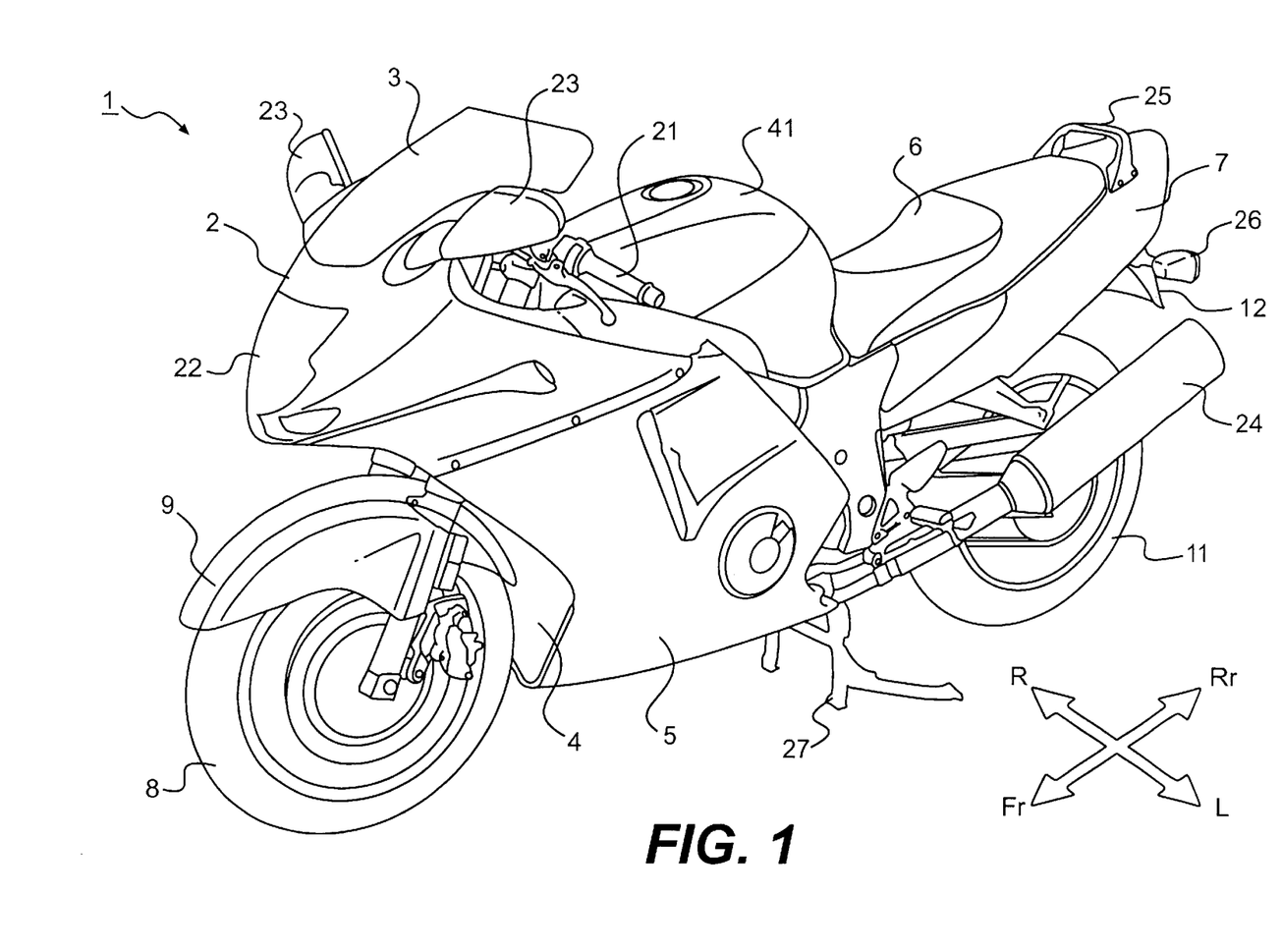
FIG. 1 is a perspective view of a motorcycle to which the invention is applicable.

FIG. 1 is a perspective view of the motorcycle to which the invention is applicable. The motorcycle 1 is of a fill cowling type, and includes an upper cowl 2 covering the front upper part of a body frame (not shown), a windscreen 3 attached to the upper part of the upper cowl 2, an inner half cowl 4 covering the front lower part of the body frame, right and left lower cowls 5 covering front lower sides of the body frame (only the left lower cowl 5 is shown in FIG. 1), a seat cowl 7 surrounding the lower part of a seat 6 at the rear part of the body frame, a front mudguard 9 covering the upper part of a front wheel 8, and a rear mudguard 12 covering the upper part of a rear wheel 11. The motorcycle 1 also includes a fuel tank 41 in front of the seat 6. Reference numeral 21 represents a steering bar handle, 22 represents a window for a head lamp and indicators, 23 represents mirrors, 24 represents a muffler, 25 represents a rear grab rail, 26 represents tail lamps, and 27 represents a center stand.

Figure 2:
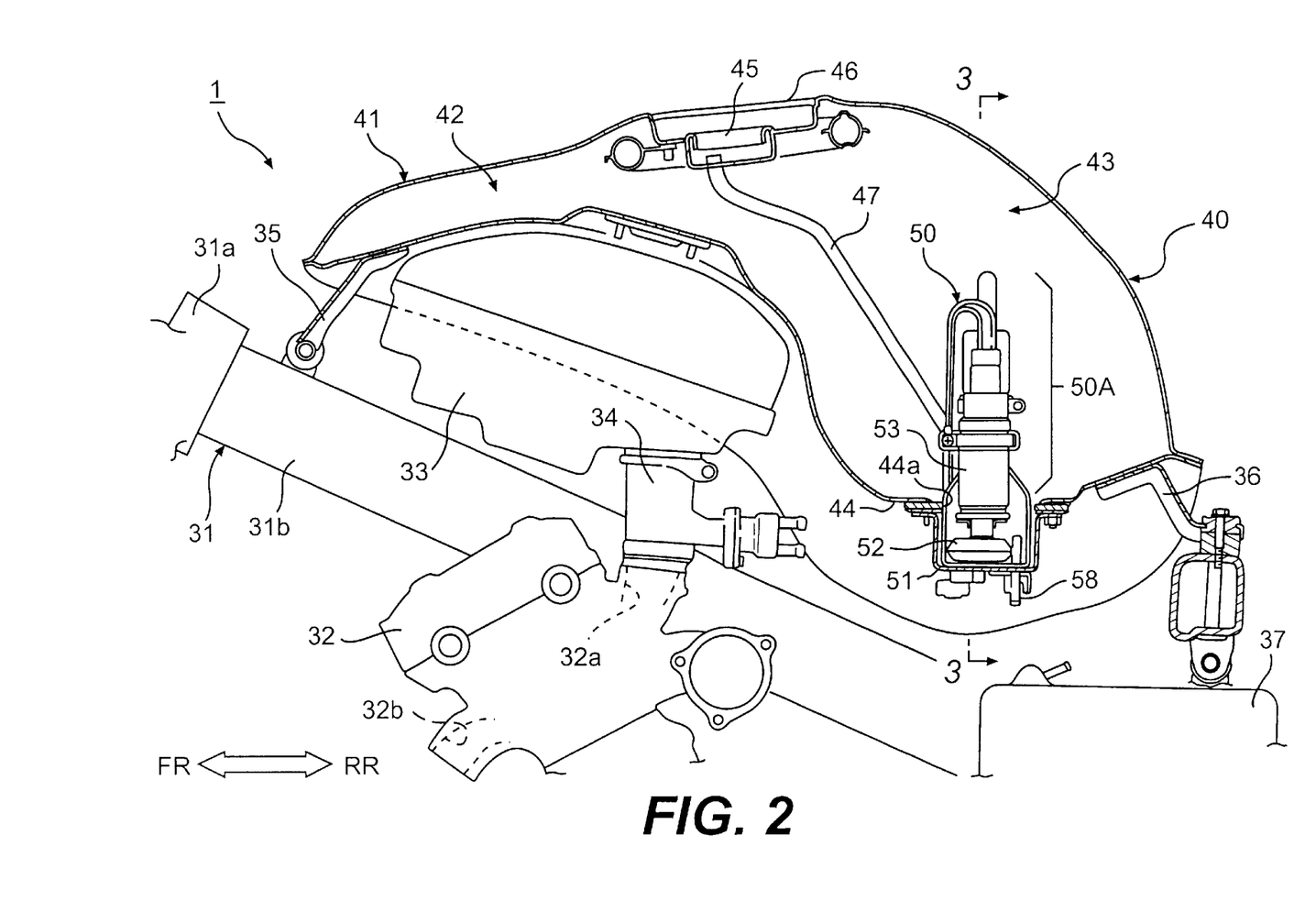
FIG. 2 is a side elevation of the fuel tank assembly and the elements of the motorcycle in the vicinity of the fuel tank.

FIG. 2 is a side sectional view of selected elements of the motorcycle in the vicinity of the fuel tank assembly 40, specifically showing the relationship between the body frame 31 and the fuel tank 41. The body frame 31 includes a head pipe 31a, and a pair of right and left main frames 31b extending obliquely downward from the head pipe 31a. An engine 32 is attached to the front lower parts of the main frames 31b, and an air cleaner 33 and the fuel tank 41 are disposed at the front upper parts of the main frame 31b. An outlet of the air cleaner 33 is connected to an inlet port of the engine 32 via passage 32a in throttle body 34. The fuel tank 41 includes a thin front half 42 covering the upper part of the air cleaner 33 and a thick rear half 43 extending further downward compared with the front half 42. A fuel pump unit 50 is provided on the bottom surface 44 of the thick rear half 43 of tank 41. Reference numeral 32b represents an exhaust port of the engine, 35 and 36 represent fuel tank supporting stays, 37 represents an oil tank, 45 represents a lid located within recessed portion 46, and 47 represents a fuel pipe.

Figure 3:
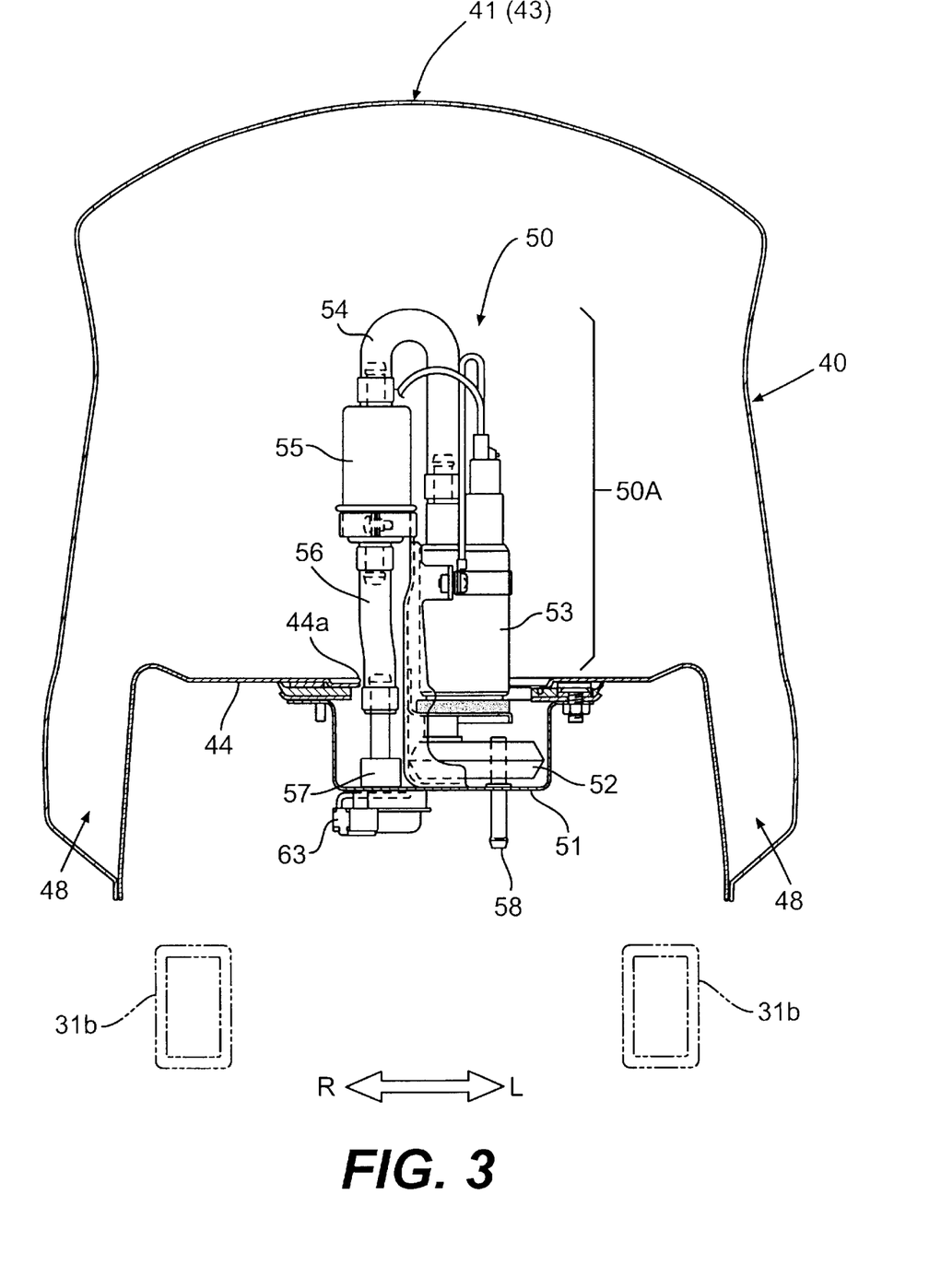
FIG. 3 is a sectional view taken along line 3—3 in FIG. 2.

FIG. 3 is a sectional view taken along line 3—3 in FIG. 2, specifically showing that a pair of right and left protrusions 48 extend downwardly from a bottom surface 44 at the rear half 43 of the fuel tank 41, and that the fuel pump unit 50 is disposed at the center of the bottom surface 44 of the rear half 43. A fuel pump mounting structure of the invention has a cross-section as shown in FIG. 4, in which the relationship between the fuel tank 41 and the fuel pump unit 50 (refer to FIG. 3) is shown on an enlarged scale.

Figure 4:
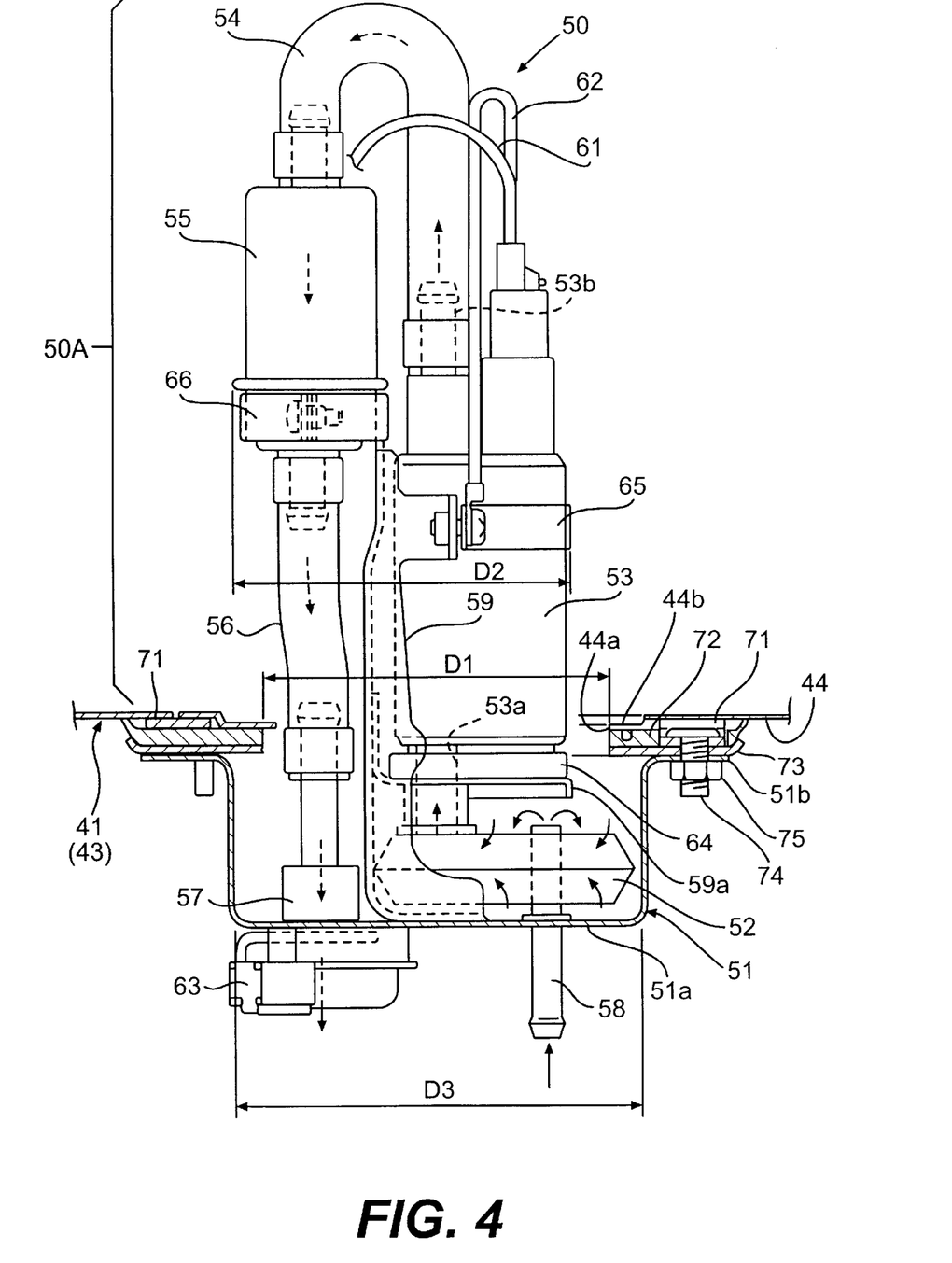
FIG. 4 is a sectional view of the fuel pump unit mounting structure of the invention.

FIG. 4 is a sectional view of the fuel pump unit mounting structure. The fuel pump unit 50 includes: a cup 51 having an open end or top, and a predetermined depth; a fuel suction filter 52 positioned near the bottom 51a of the cup 51; the fuel pump 53 having a suction port 53a connected to the fuel suction filter 52; a flow path filter 55 connected to a discharge port 53b of the fuel pump 53 using a first hose 54; a fuel supply port 57 connected to the flow path filter 55 using a second hose 56; a return pipe 58 provided on the bottom 51a of the cup 51; a stand 59 supporting the fuel pump 53 in the cup 51 and the flow path filter 55; and an external connector 63 connected to the fuel pump 53 using two lead wires 61 and 62.

Specifically, in the fuel pump unit 50, the fuel pump 53 is arranged above the fuel suction filter 52. A fuel path made of the first curved hose 54 (in the shape of an inverted U) extends downwardly from a fuel discharge port 53b at the upper part of the fuel pump 53. The flow path filter 55, second hose 56 and fuel supply port 57 are positioned below an outlet of the first hose 54. The fuel supply port 57 is then connected to the bottom 51a of the cup 51. The fuel flow path of the fuel pump unit 50 is therefore substantially in the shape of an inverted U. In the fuel pump unit 50, the fuel pump 53, the first hose 54, the flow path filter 55 and second hose 56 all project upwardly from the cup 51. These parts are collectively referred to as the "projecting part 50A" for convenience. The essential parts of the fuel pump 53 can include the majority of the fuel pump unit elements, except for the suction port 53a and discharge port 53b.

In the cup 51, the fuel supply port 57, the return pipe 58 and the external connector 63 are arranged on the bottom 51a in such a manner so as to not overlap with the fuel suction filter 52. The cup 51 has a flange 51b at its open top end which may be an integral part of the cup. The fuel suction filter 52 has a diameter which is larger than that of the fuel pump 53, in order to obtain a sufficient filtering area and a reduced suction resistance. However, an inner diameter D3 of the cup 51 can be easily determined in accordance with the diameter of the fuel suction filter 52. The reduced suction resistance of the fuel suction filter 52 improves the suction performance of the fuel pump 53. In this configuration, the fuel suction filter 52 is located between the opening 44a in the bottom surface 44 of the tank and the bottom of the cup 51a, and is spaced above the bottom of the cup 51a.

An electric motor driven pump or an electromagnetic plunger pump are suitable for use as the fuel pump 53. The return pipe 58 returns fuel to the cup 51 from a fuel supply system (not shown).

The stand 59 is in the shape of a channel and extends upwardly from the bottom 51a of the cup 51. The stand 59 supports, near its center, the underside of the fuel pump 53 via a cushion 64 placed on a lateral stay 59a and, at its upper part, supports a top part of the fuel pump 53 using a band 65. The stand 59 also fixedly supports the flow path filter 55 behind the fuel pump 53, which is secured by a band 66. The fuel pump unit 50 is therefore integrally assembled on the bottom 51a of the cup 51.

As for the fuel pump unit mounting structure, the cup 51 is attached on the bottom 44 of the fuel tank 41 in the following manner An opening 44a is formed on the bottom 44 of the fuel tank 41, and an edge 44b of the opening 44a is stepped slightly downward. A fixing ring 71 is fixedly attached around the edge 44a; a seal ring 72 is brought into contact with the edge 44a; an annular lining 73 is attached under the seal ring 72; a flange 51b of the cup 51 is attached under the annular lining 73; and a flange 51b is fastened to the fixing ring 71 using nuts 74 and bolts 75. The edge 44b slightly projects from the bottom 44, resulting in a very rigid fuel tank 41.

The method of assembling the fuel tank assembly will now be more fully described. The fuel pump unit 50 is attached to the fuel tank 41 by inserting the projecting part 50A into the fuel tank 41. Elements of the fuel pump unit such as the fuel pump, the flow path filter and connecting hoses may be inserted so that they extend into the interior of the fuel tank 41. Thereafter, the cup 51 is attached to the bottom surface 44 of the fuel tank, and forms a seal with the fuel tank 41. The fuel pump unit is secured within the fuel tank by virtue of its attachment to the cup 51, and the added free volume of the cup 51 increases the capacity of the fuel tank 41.

The opening 44a is a small hole which allows the projecting part 50A to pass through to reach the interior of the fuel tank 41. A diameter D1 of the opening 44a is slightly larger than the maximum width D2 of the projection 50A. Further, since it is not necessary to insert the fuel suction filter 52 through the opening 44a, the diameter D1 of the opening 44a can be made smaller than an inner diameter D3 of the cup 51. The small opening 44a does not adversely affect the rigidity of the fuel tank 41. Therefore, it is not necessary to thicken the fuel tank 41 or to attach a reinforcing ring around the opening 44a in order to strengthen the fuel tank 41. This simplifies construction of the fuel tank 41 and reduces its weight.

The fuel suction filter 52 of the fuel pump unit 50 is housed within the cup 51, which is effective in reducing the height of the projecting part 50A which is inserted into the fuel tank 41. The top level of the projecting part 50A is lowered in the fuel tank 41, so that other components (such as a float type level meter, or pipes) can be easily arranged within the tank.

The fuel flow will now be described. The fuel tank 41 and cup 51 communicate each other via the opening 44a. When the fuel pump 53 is activated, fuel in the cup 51 flows to a fuel injection system (not shown) via the fuel suction filter 52, the fuel pump 53, the first hose 54, the flow path filter 55, the second hose 56, and finally through the fuel supply port 57. Superfluous fuel in the fuel injection system is returned to the cup 51 via the return pipe 58.

Figure 5:
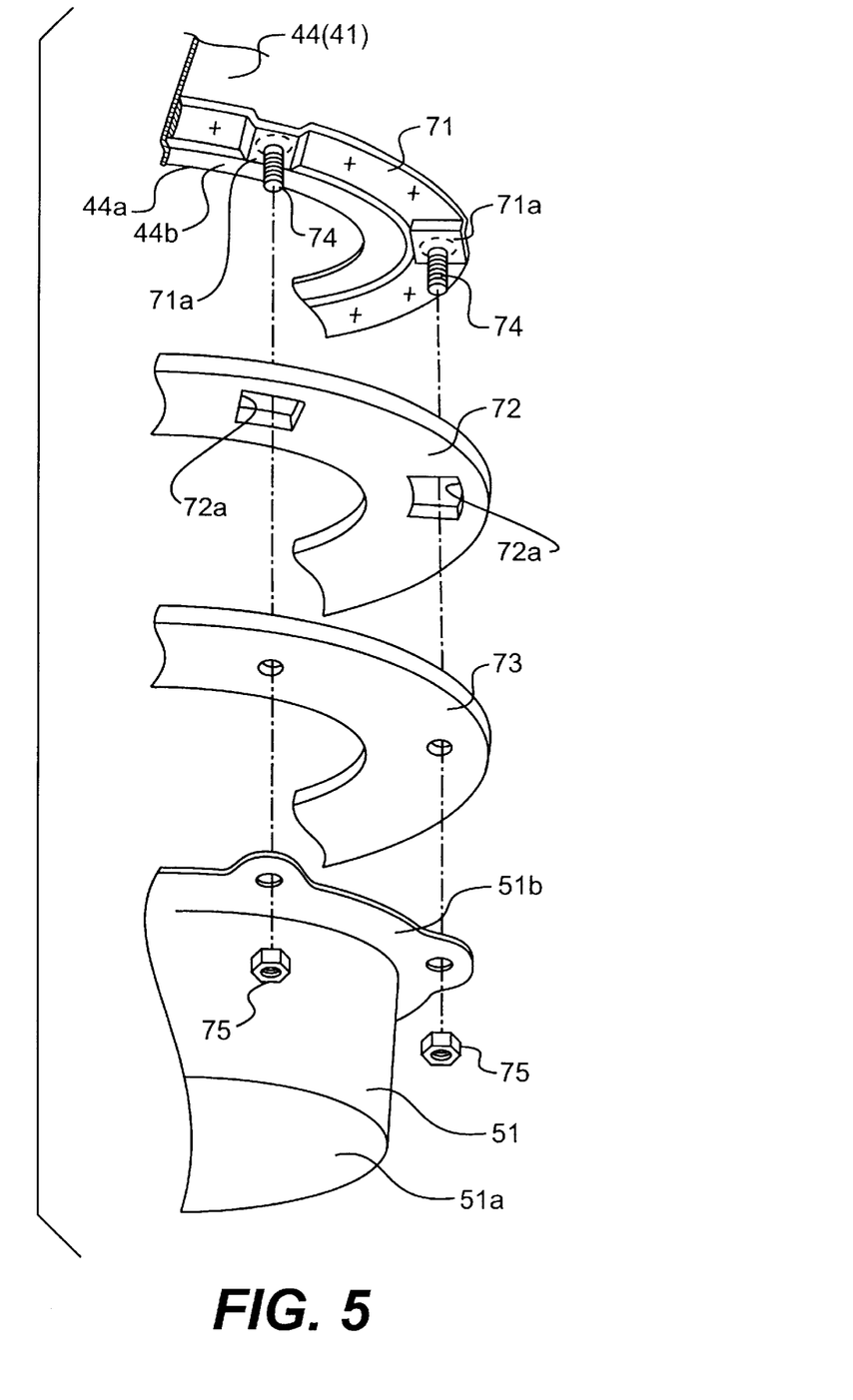
FIG. 5 is an exploded perspective view of the fuel pump unit mounting structure.

Referring now to FIG. 5, the fixing ring 71 is a substantially corrugated washer having a plurality of downward projections 71a on the underside thereof at specified intervals, and is spotwelded, or attached by some similar process, to the bottom 44 of the fuel tank 41. Each of the downward projections 71a is provided with a downward bolt 74. The seal ring 72 is formed with a plurality of through-holes 72a through which the downward projections 71a pass.

Figure 6A:
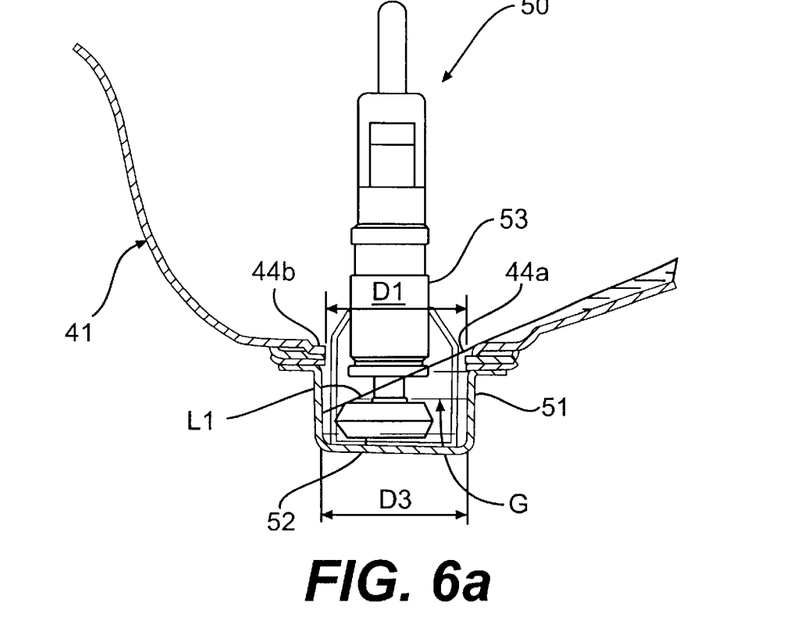
FIGS. 6a and 6b show the operation of the fuel tank assembly.
Figure 6B:
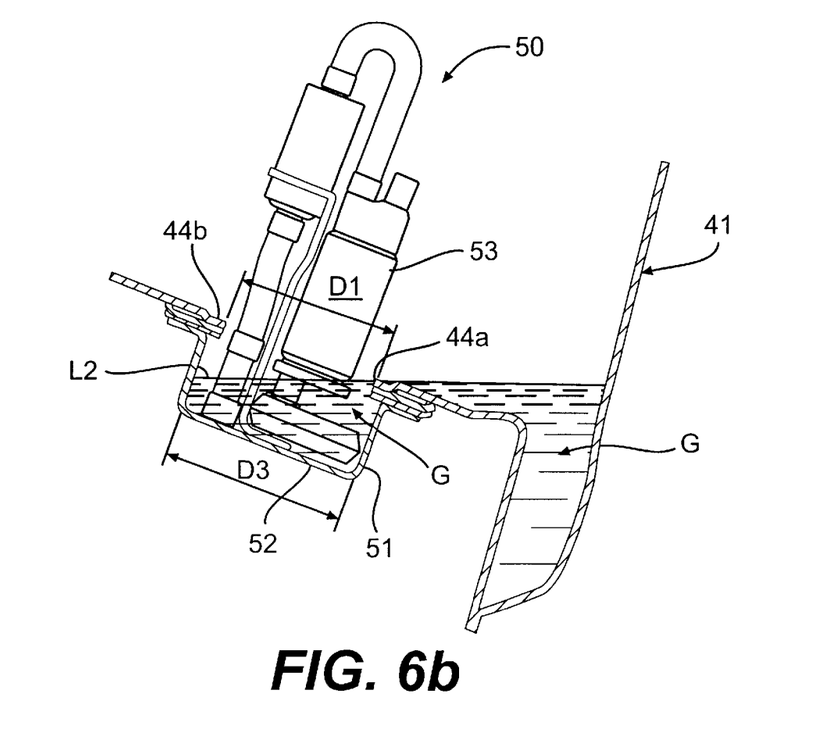

FIGS. 6(a) and 6(b) show the operation of the fuel tank of the invention. Specifically, FIG. 6(a) is a side view of the rear part of the fuel tank 41. For the sake of illustration, it is assumed here that there is a small amount of fuel in the fuel tank 41. If the motorcycle 1 is accelerated, a fuel level L1 of fuel G is inclined rearwardly. In this state, the edge 44b of the opening 44a reduces the amount of fuel G flowing from the cup 51 to the fuel tank 41, and helps to maintain the filter 52 submerged in fuel.

FIG. 6(b) is a front sectional view of the rear part of the fuel tank 41. For the sake of illustration, it is assumed that the motorcycle performs cornering while a small amount fuel is left in the fuel tank 41. The fuel G flows in the direction in which the motorcycle is inclined, and a fuel level L2 is maintained at horizontal. The edge 44b reduces the amount of fuel flowing from the cup 51 into the fuel tank 41.

As can be seen in FIGS. 6(a) and 6(b), the edge 44b extends toward the center of the opening 44b by an amount corresponding to a difference between the diameter D1 of the opening 44a and the inner diameter D3 of the cup 51. Therefore, the edge 44b reduces the amount of fuel G flowing into the fuel tank 41 from the cup 51. This arrangement prevents fuel G from flowing from the cup 51 into the fuel tank even in the case of acceleration, deceleration or cornering of the motorcycle, when the fuel level L1 or L2 is expected to fluctuate excessively. This advantageously prevents the fuel suction filter 52 from being exposed to air, and therefore enables the fuel pump 53 to reliably suck fuel without drawing air.

In the foregoing embodiment, the cup 51 may be cylindrical, or formed of any shape or configuration suitable for retention of the fuel suction filter and/or related fuel pump unit elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank assembly comprising:
   a fuel tank having a bottom surface, and an opening in the bottom surface of the fuel tank; and
   a cup having a bottom and an open end, the cup being attached to the bottom surface of the fuel tank,
   wherein the cup communicates with the interior of the fuel tank via the opening in the bottom surface of the fuel tank, and wherein the open end of the cup communicates with the opening in the bottom surface of the fuel tank, and has a cross-sectional area which is larger than the cross-sectional area of the opening in the bottom surface of the fuel tank.

2. The fuel tank assembly according to claim 5, further comprising a fuel pump unit, the fuel pump unit extending from the interior of the cup through the opening in the bottom surface of the fuel tank.

3. The fuel tank assembly according to claim 2, the fuel pump unit including a fuel suction filter located within the cup.

4. The fuel tank assembly according to claim 3, wherein the cup has a predetermined depth, and the fuel suction filter has a predetermined height, an upper surface of the fuel suction filter being located below the open end of the cup.

5. The fuel tank assembly according to claim 1, the perimeter of the opening in the bottom surface of the fuel tank forming at least a part of a peripheral edge, the peripheral edge circumscribing a cross-sectional area which is less than the cross-sectional area of the open end of the cup.

6. The fuel tank assembly according to claim 5, wherein the peripheral edge includes a fixing ring, a seal ring and an annular lining.

7. The fuel tank assembly according to claim 1, wherein the cup is substantially cylindrical and the opening in the bottom surface of the fuel tank is substantially circular in cross-section, an interior diameter of the cup being smaller than a diameter of the opening in the bottom of the fuel tank.

8. The fuel tank assembly according to claim 3, the fuel pump unit including the following elements:
   a fuel pump;
   a flow path filter; and
   a fuel supply port which is connected to the bottom of the cup.

9. The fuel tank assembly according to claim 3, wherein the opening in the bottom surface of the tank has a cross-sectional area which forms a plane, at least substantially all of the fuel suction filter being located between said plane and the bottom of the cup.

10. The fuel tank assembly according to claim 1, wherein the fuel tank is a motorcycle fuel tank including the following elements:
    a thin front half; and
    a thick rear half, wherein
    the bottom surface of the fuel tank is located at a bottom portion of the thick rear half.

11. The fuel tank assembly according to claim 1, further comprising a fuel pump unit, the fuel pump unit including the following elements:
    a fuel suction filter;
    a fuel pump;
    at least one hose; and
    a fuel supply port; wherein the cup is substantially cylindrical, and the fuel suction filter and the fuel supply port are located within the cup.

12. The fuel tank assembly according to claim 2, wherein the fuel pump unit includes a stand, the stand being attached to the bottom of the cup and supporting at least a portion of the fuel pump unit.

13. The fuel tank assembly according to claim 1, further including a fuel pump unit comprising:

a fuel suction filter; and a fuel supply port, wherein the fuel suction filter is positioned within the cup.

14. The fuel tank assembly according to claim 13, wherein the cup is substantially cylindrical, and includes a flange located on a periphery of its open end.

15. The fuel tank assembly according to claim 13, further comprising:

a fuel pump having a suction port in communication with the fuel suction filter;

a first hose connecting the fuel pump to a flow path filter; and a second hose connecting the flow path filter to the fuel supply port, wherein the fuel supply port is located within the bottom of the cup.

16. The fuel tank assembly according to claim 13, further comprising:

a fuel suction port in communication with an upper surface of the fuel suction filter, wherein an upper surface of the fuel suction filter lies between the open end of the cup and the bottom of the cup.

17. The fuel tank assembly according to claim 16, further comprising:

a return pipe in communication with a bottom surface of the fuel suction filter, wherein the bottom surface of the fuel suction filter is spaced from the bottom of the cup.

18. A method of assembling a fuel tank assembly comprising the following steps:

providing a fuel tank having an opening in a bottom surface of the tank;

providing a cup having an open end and a bottom, and having an internal diameter which is greater than an internal diameter of the opening in the fuel tank;

providing a fuel pump unit;

inserting at least a portion of the fuel pump unit through the opening in the bottom surface of the fuel tank; and attaching the cup to the fuel tank.

19. The method of assembling a fuel tank assembly according to claim 18, the step of providing a fuel pump unit including the steps of;

providing a fuel suction filter; and positioning the fuel suction filter within the cup so that a top surface of the fuel suction filter lies below the opening in the fuel tank.

* * * * *